United States Patent [19]

Jurik et al.

[11] Patent Number: 5,797,685

[45] Date of Patent: Aug. 25, 1998

[54] GEAR SHIFT TUBE SUPPORT

[75] Inventors: Mirjana Jurik; Thomas Dziegielewski, both of Rochester Hills; John Perri, Auburn Hills; Thomas Grzybowski, Fraser, all of Mich.

[73] Assignee: Chrysler Corporation, Auburn Hills, Mich.

[21] Appl. No.: 755,045

[22] Filed: Nov. 22, 1996

[51] Int. Cl.⁶ .................................................. B60K 20/06
[52] U.S. Cl. ..................... 384/215; 180/78; 74/473.31
[58] Field of Search ............................. 180/336, 337, 180/78; 384/215, 441, 295; 74/473.31

[56] References Cited

U.S. PATENT DOCUMENTS

| | | | |
|---|---|---|---|
| 2,179,368 | 11/1939 | Baade | 74/473.31 |
| 3,434,367 | 3/1969 | Renneker et al. | 74/473.31 |
| 3,543,600 | 12/1970 | Wight et al. | 74/473.31 |
| 3,646,828 | 3/1972 | Milton et al. | 74/473.31 |
| 3,670,592 | 6/1972 | Senft et al. | 74/473.31 |
| 4,267,743 | 5/1981 | Tanaka | 74/473.31 |
| 4,909,639 | 3/1990 | Belanger | 384/296 |
| 5,413,414 | 5/1995 | Bauer | 384/276 |
| 5,669,718 | 9/1997 | Sakairi et al. | 384/220 |

FOREIGN PATENT DOCUMENTS

| | | | |
|---|---|---|---|
| 192531 | 8/1986 | European Pat. Off. | 384/215 |
| 49413 | 5/1981 | Japan | 384/295 |

*Primary Examiner*—Harold J. Tudor
*Assistant Examiner*—Christopher K. Montgomery
*Attorney, Agent, or Firm*—Lawrence J. Shurupoff

[57] ABSTRACT

A device for rotatably supporting a gear shift tube within a tubular steering column of an automotive vehicle. The device comprises a support of integral, one-piece construction made of an elastomeric, resinous plastic material disposed within a cup rigidly secured in the lower end of the steering column. The support comprises an open-ended bearing sleeve co-axial with the cup having an end portion extending through an opening in the bottom wall of the cup. The sleeve has angularly spaced abutments inside the cup abutting the inner surface of the bottom wall of the cup around the opening. The sleeve also has angularly spaced tangs outside the cup extending radially outwardly and abutting the outer surface of the bottom wall of the cup around the opening. The abutments and the tangs cooperate in locking the bearing sleeve axially within the cup. The bearing sleeve is preferably made of urethane reinforced with glass fibers. A suitable lubricant, such as mineral oil, may also be incorporated into the material of which the sleeve is made. TEFLON may be added to the material of which the sleeve is made to reduce noise and permit smoother rotation of the gear shift tube.

11 Claims, 3 Drawing Sheets

5,797,685

1
GEAR SHIFT TUBE SUPPORT

FIELD OF INVENTION

This invention relates to a device for supporting a gear shift tube in a steering column of an automotive vehicle.

BACKGROUND AND SUMMARY OF THE INVENTION

Typically, a gear shift tube extends lengthwise within the steering column and is supported in a manner such that it can be rotated to shift gears. Previous supports have been difficult to retain in the working position. Over the life of the steering column, these previous supports have had a tendency to move away from their working position, leaving the gear shift tube inadequately supported.

In accordance with the embodiment of the invention to be described, a tubular support is provided which preferably is of integral, one-piece construction and made of an elastomeric resinous plastic material. The support is fitted within a cup at the bottom of the steering column. The support comprises an open-ended bearing sleeve co-axial with the cup having an end portion extending through an opening in the bottom of the cup. The sleeve has angularly spaced abutments inside the cup which bear upon the inner surface of the bottom wall of the cup around the opening. The sleeve also has angularly spaced tangs outside the cup which bear upon the outer surface of the bottom wall of the cup around the opening and cooperate with the abutments in locking the sleeve axially within the cup.

Preferably, the sleeve has angularly spaced transverse slots which separate it into arcuate sleeve segments, with one of the abutments bridging each slot. The abutments are preferably in the form of arcuate sectors spaced radially outwardly from the sleeve, each having a first web connected to one sleeve segment and a second web connected to an adjacent sleeve segment. By this construction, the sleeve is sufficiently flexible to enable easy installation and then to hold its position within the cup without any tendency to move away or become loose. Thus, the sleeve is designed to be firmly retained in working position and to support the gear shift tube over the full life of the steering column.

One object of this invention is to provide a device for rotatably supporting a gear shift tube within a steering column having the foregoing features and capabilities.

Another object is to provide a device for rotatably supporting a gear shift tube within a steering column which is of simple construction, is rugged and durable in use, and is capable of being inexpensively manufactured and readily assembled.

These and other objects, features and advantages of the invention will become more apparent as the following description proceeds, especially when considered with the accompanying drawings and claims.

2

Figure 5:
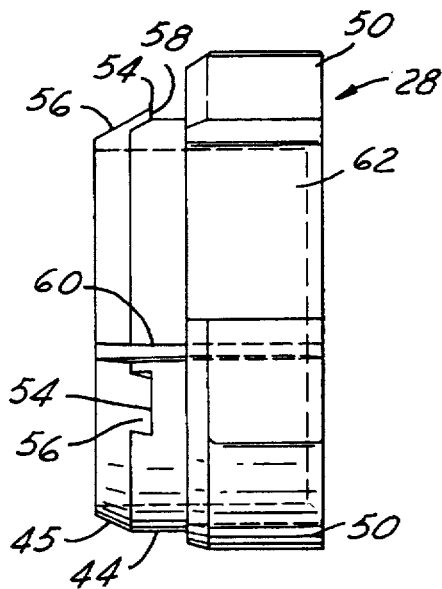

FIG. 5 is a side elevational view of the gear shift tube support as seen from one end.

Figure 6:
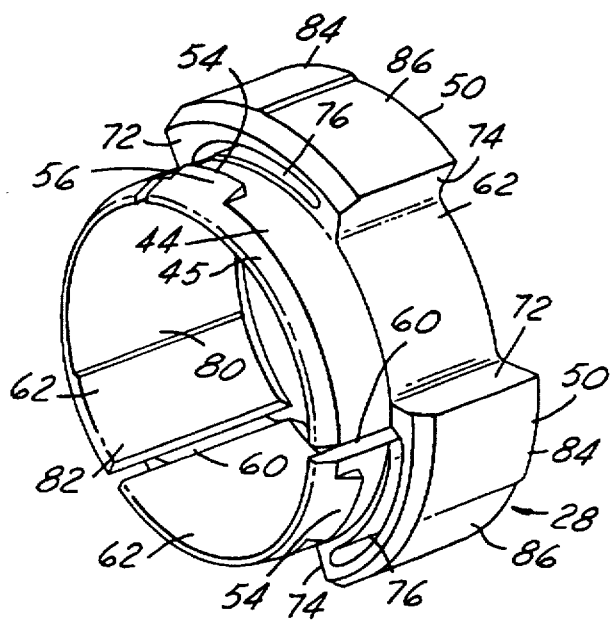

FIG. 6 is a perspective view of the gear shift tube support.

Figure 7:
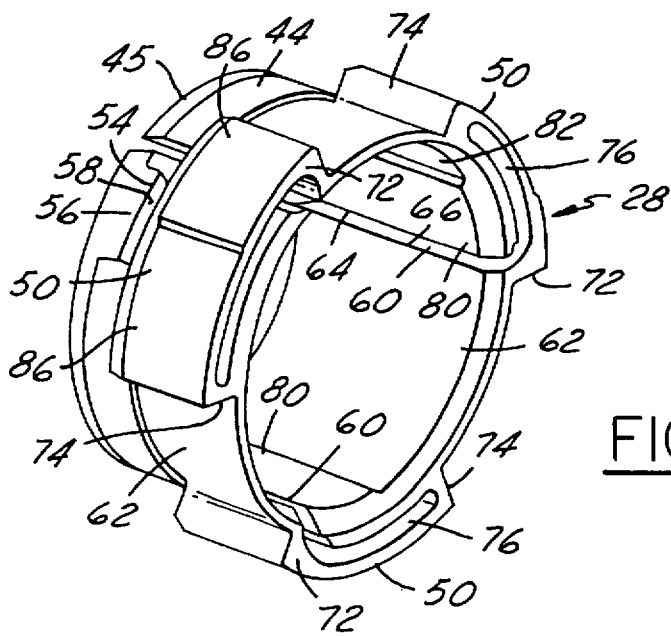

FIG. 7 is a perspective view of the gear shift tube support as seen from a different angle.

DETAILED DESCRIPTION

Figure 1:
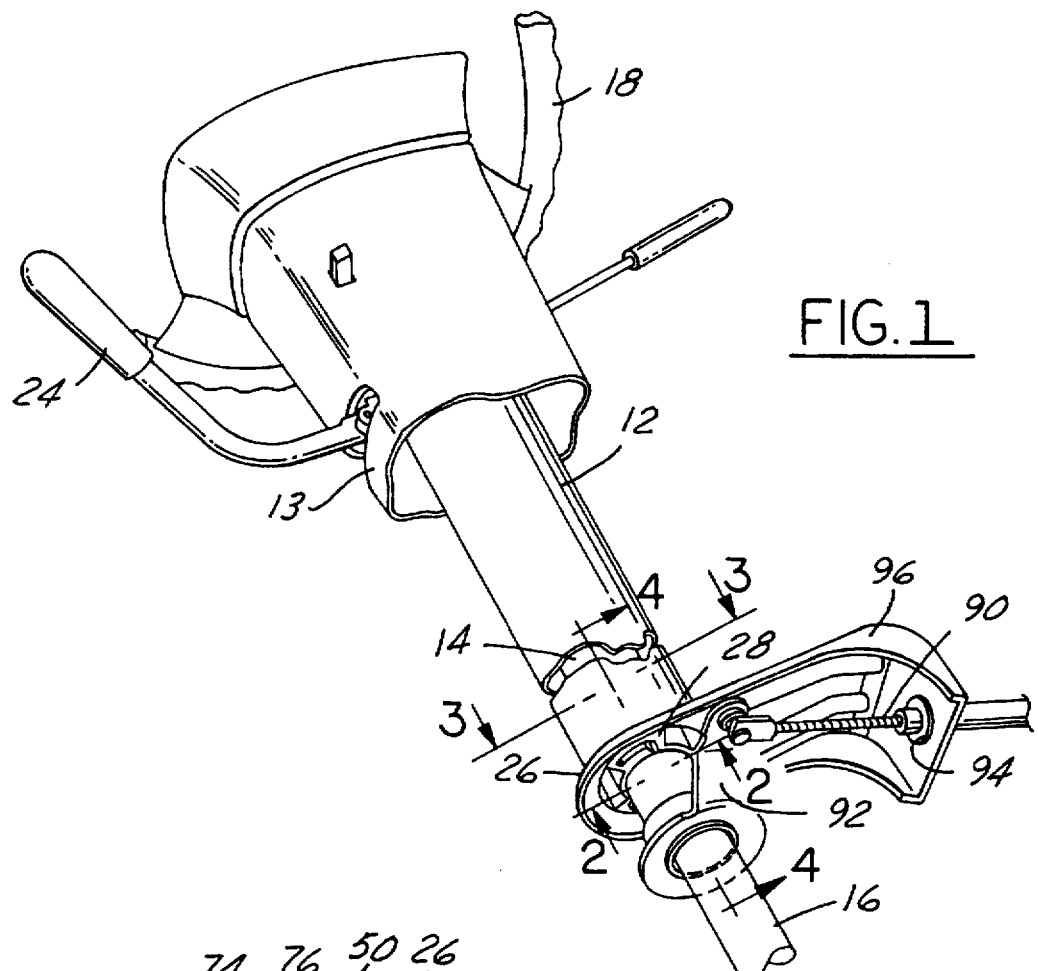
FIG. 1 is a perspective view, with parts broken away, of a steering column of an automotive vehicle, having a device for rotatably supporting a gear shift tube within the steering column, constructed in accordance with the invention.

Referring now more particularly to the drawings, and especially FIG. 1, a steering column assembly 10 is shown comprising an elongated downwardly and forwardly tilted tubular steering column 12 within a cover 13. An elongated gear shift tube 14 extends lengthwise within the steering column. Extending lengthwise within the gear shift tube 14 is an elongated steering shaft 16. A steering wheel 18 is mounted on the upper end of the steering shaft. A shaft coupler (not shown) on the lower end of the steering shaft is operatively connected to a steering gear assembly to steer the front wheels of the automotive vehicle.

The gear shift tube 14 is supported for rotation in the steering column by a supporting device 22 and is rotated in the usual manner by a gear shift lever 24 projecting laterally from the upper portion of the steering column.

Figure 2:
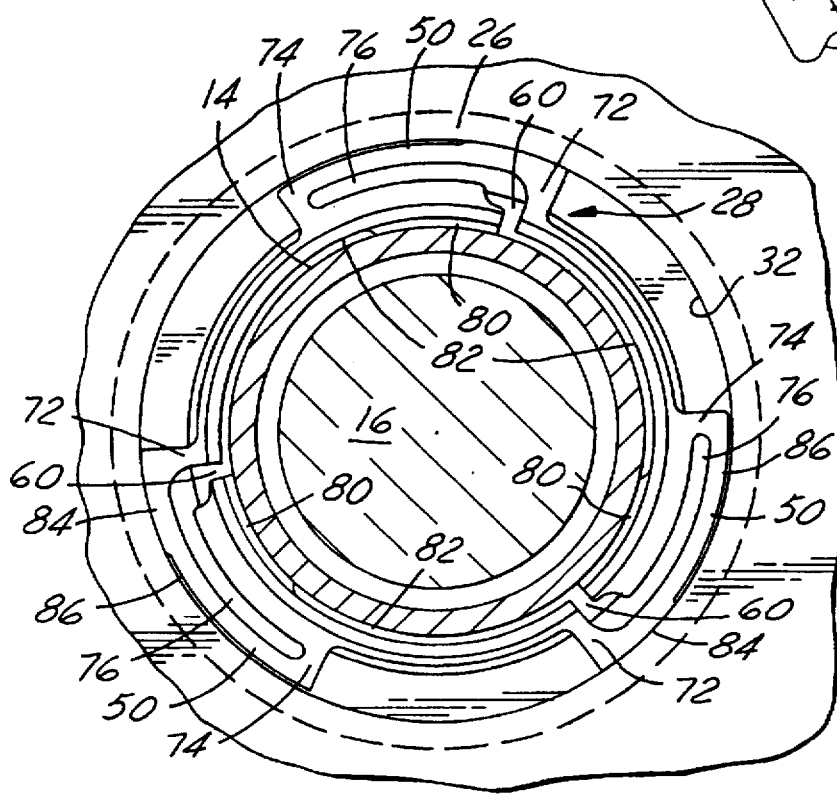
FIG. 2 is a sectional view taken on the line 2—2 in FIG. 1.
Figure 3:
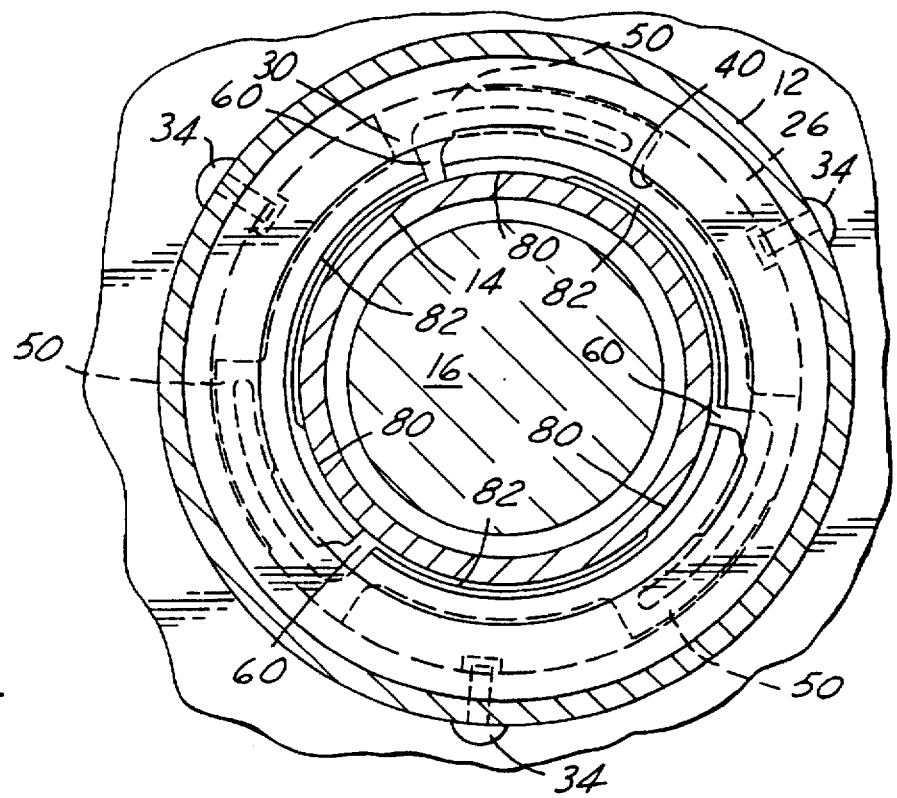
FIG. 3 is a sectional view taken on the line 3—3 in FIG. 1.
Figure 4:
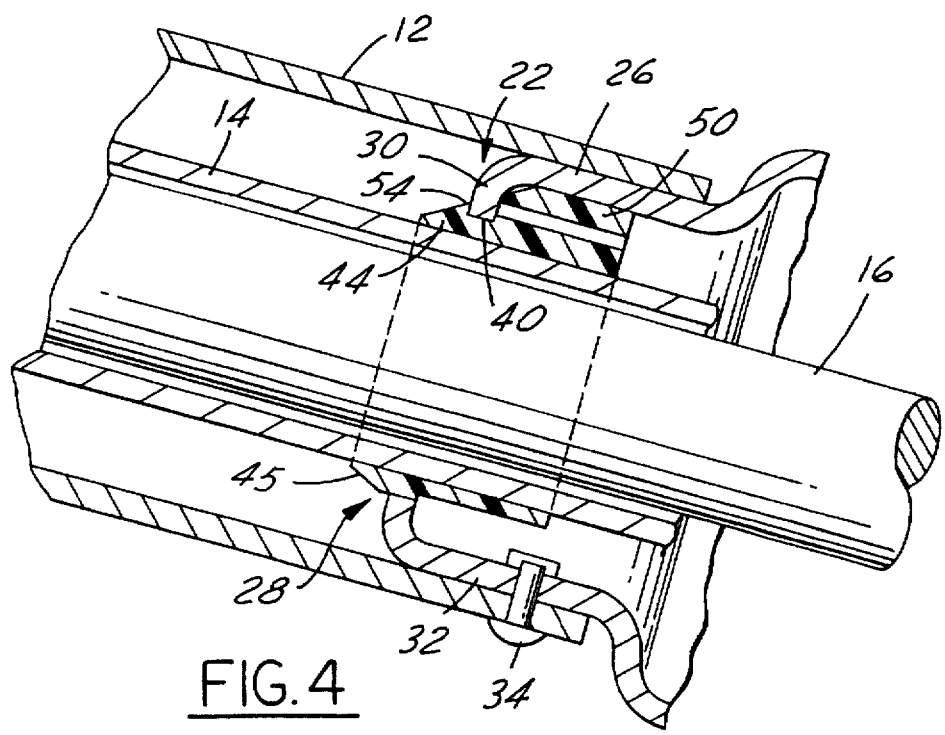
FIG. 4 is a sectional view taken on the line 4—4 in FIG. 1.

The device 22 comprises a cup 26 secured in the bottom of the steering column, and a support 28 (FIGS. 2–4). The cup 26 is co-axial with the steering column and is fitted in the bottom thereof with the base or bottom wall 30 of the cup uppermost and with its cylindrical side wall 32 engaging the cylindrical wall of the steering column. The cup 26 is rigidly secured to the steering column by any suitable means and in the present instance this is accomplished at three points by rivets 34 or by upsetting the metal of the steering column and the cup side wall to form cleats to clinch the metal together and mechanically holding the cup in place within the steering column. The bottom wall 30 of the cup is perpendicular to the steering column and has a central circular hole 40 therethrough.

Referring to FIGS. 5–7, the support 28 is in the form of an open-ended tubular bearing sleeve of integral, one-piece construction made preferably of a flexible, elastomeric, resinous plastic material. Preferably, the material of the sleeve 28 is urethane and to increase the strength of the sleeve and enhance its durability, glass fibers may be added in an amount which by weight, when compared with the amount of urethane, is in a range of 10%–30% and preferably about 20%. A lubricant may be added to the material of which the sleeve is made and excellent results have been achieved with a mineral oil. The lubricant added will preferably constitute about 2% by weight of the total mix. In place of mineral oil, a tetrafluoroethylene resin known by the tradename TEFLON may be added in an amount equal to about 12% of the total mix. TEFLON has the advantage of reducing noise and permitting smoother rotation of the gear shift tube.

The sleeve 28 is disposed within the cup and is co-axial with the cup, having an end portion 44 extending through the opening 40 in the bottom wall of the cup. The end portion 44 of the sleeve has a close fit in the opening 40 and has a taper 45 on the outer surface to facilitate assembly.

The bearing sleeve 28 has angularly spaced arcuate abutments 50 inside the cup which are spaced radially outwardly from the sleeve. The abutments contact the side wall of the cup and abut the inner surface of the bottom wall 30 of the cup around the opening. Angularly spaced tangs 54 outside the cup extend radially outwardly from the inner end portion 44 of the sleeve and abut the outer surface of the bottom wall 30 of the cup around the opening 40 therein. The tangs are sloped on one side forming camming surfaces 56 enabling the tangs 54 to compress and squeeze through the opening 40 when the sleeve is installed in the cup. On the other side, the tangs have right angle surfaces 58 which are normal to the axis of the sleeve and are designed to have a firm abutting contact with the bottom wall 30 of the cup around the opening. The abutments 50 and tangs 54 cooperate in locking the sleeve 28 axially within the cup 26.

The sleeve 28 is formed with angularly spaced transverse slots 60. The slots 60 extend completely across the sleeve and separate the sleeve into arcuate sleeve segments 62 having juxtaposed ends 64,66. The slots 60 between the sleeve segments are respectively bridged and integrally connected by the abutments 50. Each of the abutments 50 is in the form of an arcuate sector spaced radially outwardly from the sleeve 28 and having circumferentially spaced ends integrally connected to two adjacent sleeve segments across the slot therebetween. One end of each abutment is integrally connected by a first web 72 to one of the two sleeve segments at one of the ends 64 thereof. The other end of the abutment is integrally connected by a second web 74 to the other of the two adjacent sleeve segments, but at a point spaced from the slot. It will be noted that there is a space 76 provided between each arcuate sector and the sleeve which extends circumferentially from the first web to the second web and communicates with the slot 60 bridged by the abutments. The slots 60 and spaces 76 make the sleeve more flexible and easier to assembly into the cup.

The radially inner surface of each sleeve segment 62 has a raised portion 80 which is smooth and cylindrical. The cylindrical gear shift tube 14 fits within this radially inner surface portion 80 and is capable of being rotated by the steering wheel. The remaining portion 82 of the inner surface of each sleeve segment is relieved and out of contact with the gear shift tube.

The radially outer surface of each abutment 50 has a raised portion 84 which is cylindrical and makes contact with the side wall 32 of the cup 26. The remaining portion 86 of the outer surface of each abutment is relieved and out of contact with the cup wall. The relief of the outer surface of the abutments provides increased flexibility to facilitate assembly of the bearing sleeve 28 into the cup.

A transmission cable 90 (FIG. 1) has one end connected to an arm 92 rigidly secured to the lower end of the gear shift tube 14 and projecting radially outwardly therefrom. The transmission cable extends to the transmission of the vehicle and passes through a guide opening 94 on the outer end of an arm 96 formed integrally with the cup 26 and projecting radially outwardly from the steering column.

The bearing sleeve 28 is securely affixed in the cup 26 in the desired working position for supporting the gear shift tube 14 for rotation. The sleeve is formed of a material which is long lasting and designed to hold its position within the cup over a long period of time.

We claim:

1. A device for rotatably supporting a gear shift tube within a tubular steering column of an automotive vehicle comprising:

a cup adapted to be rigidly secured in the steering column, said cup having a bottom wall and an annular side wall, the bottom wall having inner and outer surfaces and formed with a central opening, a support of integral, one-piece construction made of a flexible, elastomeric, resinous plastic material disposed within said cup, said support comprising an open-ended bearing sleeve co-axial with said cup having an end portion extending through and having a close fit in said opening, said sleeve having angularly spaced abutments inside said cup extending radially outwardly from said sleeve and abutting the inner surface of the bottom wall of the cup around said opening, and angularly spaced tangs outside said cup extending radially outwardly from the end portion of the sleeve and abutting the outer surface of the bottom wall of the cup around the opening therein and cooperating with said abutments in locking said sleeve axially within the cup.

2. A device as defined in claim 1, wherein said sleeve has a smooth cylindrical radially inner surface for rotatably supporting the gear shift tube.

3. A device as defined in claim 2, wherein said sleeve has angularly spaced transverse slots separating said sleeve into arcuate sleeve segments having juxtaposed ends, the juxtaposed ends of said segments being respectively bridged and integrally connected by said abutments.

4. A device as defined in claim 3, wherein each of said abutments is in the form of an arcuate sector spaced radially outwardly from said sleeve and having circumferentially spaced ends integrally connected to two adjacent sleeve segments across the slot therebetween.

5. A device as defined in claim 4, wherein one of the ends of each said abutment is integrally connected by a first web to one of the two adjacent sleeve segments at the slot therebetween and the other end thereof is integrally connected by a second web to the other of the two adjacent sleeve segments at a point spaced from the slot therebetween.

6. A device as defined in claim 5, wherein a space is provided between each arcuate sector and said sleeve which extends circumferentially from the first web to the second web and communicates with the slot bridged by said sector, said spaces and slots increasing the flexibility of the sleeve.

7. A device as defined in claim 1, wherein said bearing sleeve is made of urethane.

8. A device as defined in claim 7, wherein said bearing sleeve is reinforced with glass fibers.

9. A device as defined in claim 6, wherein said bearing sleeve is made of a mixture including urethane reinforced with glass fibers.

10. A device as defined in claim 6, wherein said bearing sleeve is made of a mixture of urethane reinforced with glass fibers and includes a lubricant.

11. A device as defined in claim 6, wherein said bearing sleeve is made of a mixture of urethane reinforced with glass fibers and includes a fluorinated polymer.

* * * * *